United States Patent [19]

Güthe

[11] Patent Number: 4,896,922
[45] Date of Patent: Jan. 30, 1990

[54] PLASTIC WHEEL ASSEMBLY

[75] Inventor: Friedrich W. Güthe, Wermelskirchen, Fed. Rep. of Germany

[73] Assignee: Tente Rollen Gesellschaft mit beschrankter Haftung & Co., Wermelskirchen, Fed. Rep. of Germany

[21] Appl. No.: 249,447

[22] Filed: Sep. 26, 1988

[30] Foreign Application Priority Data

Sep. 26, 1987 [DE] Fed. Rep. of Germany ....... 3732505

[51] Int. Cl.$^4$ .............................................. B60B 5/02
[52] U.S. Cl. .................................. 301/63 PW; 428/65; 428/156
[58] Field of Search ............ 301/63 PW; 428/65, 920, 428/921, 156

[56] References Cited

U.S. PATENT DOCUMENTS 4,554,704 11/1985 Raffaeli .............................. 16/18 R Primary Examiner—Alexander S. Thomas
Attorney, Agent, or Firm—Collard, Roe & Galgano

[57] ABSTRACT

A wheel assembly has a rim body made from injection-moldable plastic. A tire is applied to the plastic rim which tire consists of thermoplastic rubber. For achieving a high resistance to heat and fire without impairing the cohesion between such materials, the body or rim consists of a halogen-free polypropylene copolymer and the tire consists of a polypropylene vulcanized cross-linked with an EPDM rubber.

6 Claims, 1 Drawing Sheet

PLASTIC WHEEL ASSEMBLY

BACKGROUND OF THE INVENTION

1. Field of the Invention

The invention relates to a plastic wheel assembly, in particular for casters or rollers, with a rim or body made from injection-moldable plastic, and with a tire applied thereto consisting of thermoplastic rubber.

2. Description of the Prior Art

A plastic wheel assembly as disclosed herein is the subject matter of German Publication DE OS No. 36 26 246 AI which was published on Feb. 18, 1988. The wheel assembly disclosed by this patent includes a highly intimate bond between the two components forming the wheel assembly. Even extreme loads occurring when the wheel is rotated under a high load are tolerated without damage, as when an aircraft having such a wheel as a landing wheel comes into contact with the ground. On the other hand, particularly in the aviation sector, it is highly desirable to achieve a high resistance to heat and fire, i.e., it is necessary for such plastic wheel assembly to have a low flammability. German Patent OS No. 2 232 752 and U.S. Pat. No. 4,554,704 disclose wheel assemblies having elastomeric parts.

SUMMARY OF THE INVENTION

It is an object of the invention to provide a plastic wheel assembly which resists heat and fire.

It is yet another object of the invention to provide a plastic wheel assembly which may have a tire assembled to a rim thereof by stabilizing peaks of a textured surface formed on the rim.

It is yet another object of the invention to provide a plastic wheel assembly which is simple in design and economical to manufacture.

Accordingly, these and other objects of the invention are achieved by a wheel assembly made from injection-moldable plastic which retains the high bond strength achieved between the tire and the rim body. In this way, safety levels in the field of application of such running wheel assemblies are markedly raised and the field of application for the wheel assemblies of the present invention is expanded.

According to the invention, the rim body consists of a halogen-free polypropylene copolymer, and the tire is made from polypropylene vulcanized in a cross-linked manner with an EPDM-rubber. The combination or pairing of these materials not only accomplishes the main objective of achieving heat resistance, but also results in an excellent cohesion between the parts. This eliminates slipping between the components forming the running wheel and produces the desired high mechanical strength. To form the rim body, use can be made of a product that is commercially available under the name POLYFLAM RIPP 395 N D. This material is well-suited for injection molding and, furthermore, complies with UL-standard 94 V 0 starting with a wall thickness of 1.6 mm. This material also is well-known for having other favorable processing and manufacturing properties. POLYFLAM RIPP 395 N D, furthermore, exhibits a relatively high resistance to UV due to the fact that the flame-retarding additives are free from halogen.

In addition, this material does not exhibit corrosive properties when exposed directly to a flame. A suitable material for the tire is commercially available under the trade name "SANTOPRENE" (251-80). The density of smoke produced in the event of fire using these materials, if any, is extremely low. In order to obtain a favorable low smoke-producing embodiment of the invention, it is desirable for the polypropylene to include halogens and/or bromine constituents. These basic chemicals promote the suppression of smoke so that vision is not impaired in a fire situation. For the optimal cross-linkage of the two components, it is beneficial for the tire material to be applied to a textured outer surface of the rim body using heat.

Furthermore, it may be desirable to obtain not only, for example, a tooth-like mating of the neighboring material contact zones, but also an enlarged bonding surface area so that a correspondingly higher bonding strength may be achieved between the material contact zones. It is useful for the surface texturing to be graduated in such a way that the peak zones of such texturing are caused to be slightly solubilized by the application of heat. An application of heat suffices as the activator of such solubilizing even when a deeply anchored bond is required. The solubilizing effect is so great that if separation between the tire and rim is caused under test conditions by the application of force, the relatively harder material of the rim body will usually fail first. Thus, the boundary of separation or splitting will appear as part of the rim and not the actual joint between the two materials forming the wheel. The proportion of polypropylene added to the ethylene-propylene terpolymer rubber, with homogeneous distribution, makes for equal composite material components in both components of the wheel.

BRIEF DESCRIPTION OF THE DRAWINGS

In the drawing, wherein similar reference characters denote similar elements throughout the several views.

DESCRIPTION OF THE PREFERRED EMBODIMENT

Figure 1:
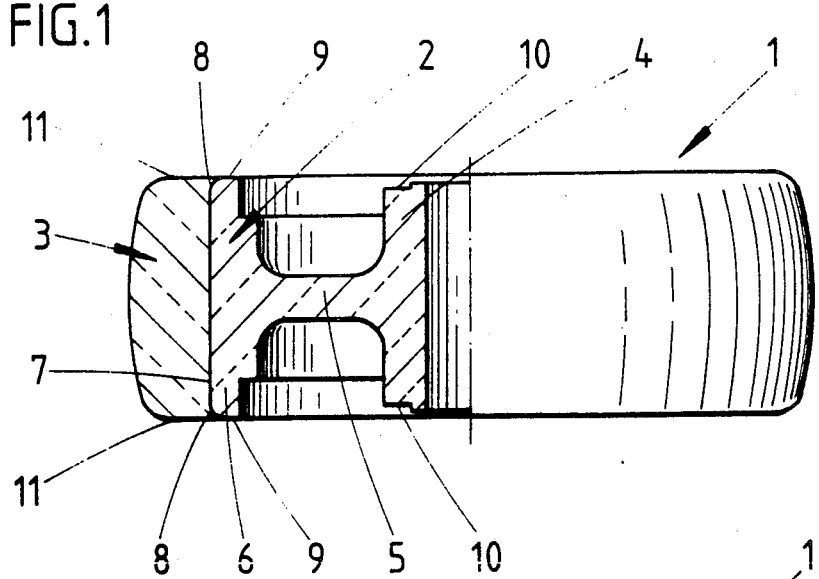
FIG. 1 is a top view of the wheel assembly according to the present invention partially in cross section.
Figure 2:
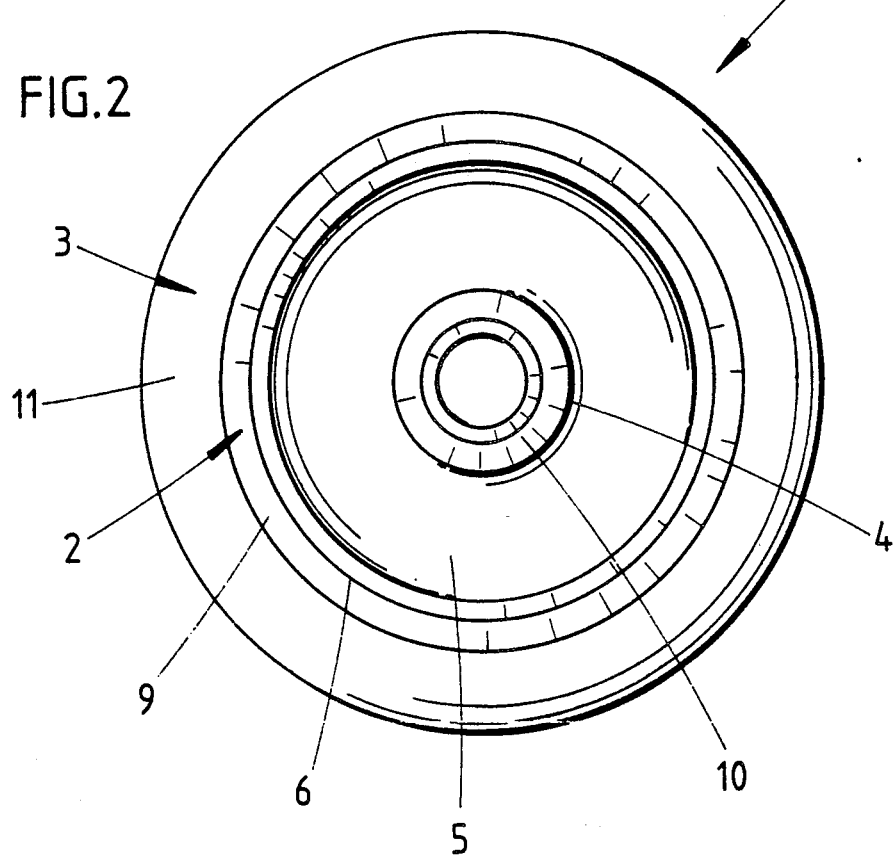
FIG. 2 is a side view of the wheel assembly of FIG. 1.

Referring to FIGS. 1 and 2, there is shown a wheel generally denoted as 1 which consists of a rim body 2 with a tire 3 applied to rim body 2 by injection molding. Rim body 2 has a center hub 4 as is normally found with such rims.

Hub 4, on its radially outer side, changes into annular flange 6 by way of a symmetric disk shaped bridge 5. The circumferential outer surface 7 of flange 6 of rim body 2 extends the entire width of wheel assembly 1 and, on the sides of the edge of rim 2, changes via radius 8 into side surfaces 9 of rim body 2. Surfaces 9 extend radially inwardly on both sides from outer surface 7 towards bridge 5. Practically the same shape and thus, "milling" conditions exist across the total width of the wheel. Surfaces 10 of hub 4 are slightly recessed in the axial direction as compared to surface 9. Surfaces 10 are stepped concentrically with the axis of rotation of the wheel. The side surfaces 11 of tire 3 are aligned with surfaces 9 of the rim body 2. The actual circumferential running surface of tire 3 has a slightly convex curvature ending in side surface 11 via a relatively sharp radius.

Rim body 2 consists of a halogen-free polypropylene copolymer, which is commercially available under the trade name POLYFLAM RIPP 395 N D. This product has the properties listed in the following table:

|  | Standard | Units | Measurement |
|---|---|---|---|
| Density | DIN 53 479 | g/cm$^3$ | 1.02 |
| Water absorption after 24 hours | DIN 53 495 | % | 0.10 |
| Melting index (MFI) | DIN 53 735 | g/10 min | 5 |
| Notch impact strength at 23° C. | ASTM D 256 | J/m | 65 |
| at 0° C. | ASTM D 256 | J/m | 65 |
| at −40° C. | ASTM D 256 | J/m | 36 |
| Tensile strength | DIN 53 455 | N/mm$^2$ | 17 |
| Elongation at break | DIN 53 455 | % | 28 |
| E-modulus | DIN 53 457 | N/mm$^2$ | 1400 |
| ISO/R 75 Method A | DIN 53 461 | °C. | 62 |
| Vicat softening point B | DIN 53 460 | °C. | 75 |
| Ball pressure hardness o 2 mm - 125° C. | VDE 0470/1.61 mm |  | 1.75 |
| Flame retardation | UL 94 | 1.6 mm | UL-V-0 |
| Limiting oxygen index | ASTM D 2863 |  | 34 |
| Resistance to creep current |  |  | KC 600 |

Tire material 3, however, consists of polypropylene vulcanized cross-linked with an EPDM rubber (ethylene-propylene terpolymer). Cross-linking of the two components forming wheel assembly 1 is accomplished by applying heat to tire 3. The outer surface 7 of flange 6 is roughened or textured with a profile graduated such that the peaks of the elevations of the texturing begin to be solubilized by the heat under which the rubber is applied. The roughening or texturing of surface 7 to form a textured profile on flange 6 of body rim 2 can be achieved in the form of grooves extending crosswise across surface 7. Cutting grooves in a criss-cross pattern can be done which leads to a great number of small in-line pyramids. The cross angles of such grooves may be, for example, around 90 degrees. Of course, provision may be made for steeper angled flanks, so that the pyramids will be more pointed. Another type of texturing can be obtained by erosion. What is stated and taught regarding this method of texturing in the aforementioned patent DE OS No. 36 26 246 is specifically incorporated herein by reference.

The trade name of the material which may be used to form the outer tire surface is "Santoprene". Santoprene grade "251-80" was found to have an optimal self-extinguishing effect to enhance the low flammability desired. In addition to the properties of low flammability and resistance to heat, it is also desirable to achieve a particularly effective smoke suppression. To this end, it is proposed that the polypropylene contain halogens and-/or bromine constituents.

While one embodiment and example of the present invention has been described and/or shown, it is obvious that many changes and modifications may be made thereunto, without departing from the spirit and scope of the invention.

What is claimed is:

1. A wheel assembly comprising:
   a rim body made from injection-moldable plastic consisting of a halogen-free polypropylene copolymer;
   a tire made of thermoplastic rubber applied to said rim body consisting of polypropylene vulcanized cross-linked with an EPDM rubber .

2. The wheel assembly as set forth in claim 1, wherein the polypropylene of said tire has halogen components.

3. The wheel assembly as set forth in claim 1, wherein the polypropylene of said tire has bromine components.

4. The wheel assembly as set forth in claim 1, wherein said tire is applied to a textured outer circumferential surface of said rim body under the influence of heat.

5. The wheel assembly as set forth in claim 4, wherein the textured outer circumferential surface of said rim body has a profile having peak zones such that the application of heat thereto slightly solubilizes said peak zones of said textured surface.

6. The wheel assembly as set forth in claim 5, wherein the profile of said textured surface is in the form of crisscrossing grooves.

* * * * *